Jan. 29, 1957            R. T. JEDLICK            2,779,257
MACHINE FOR REMOVING WASTE SLUGS FROM CARTON BLANKS
Filed June 10, 1955            7 Sheets-Sheet 2
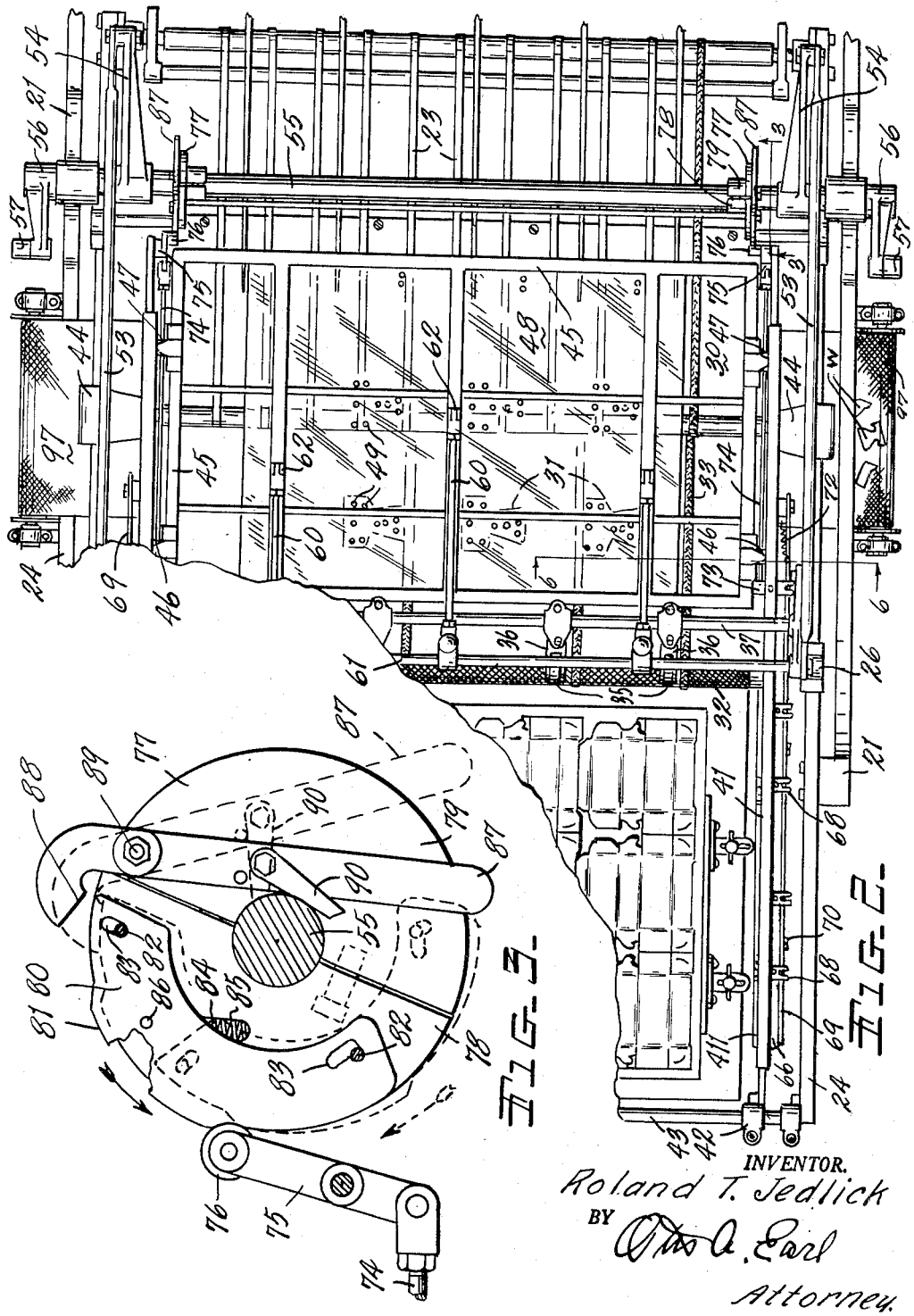
INVENTOR.
Roland T. Jedlick
BY
Otto A. Earl
Attorney.

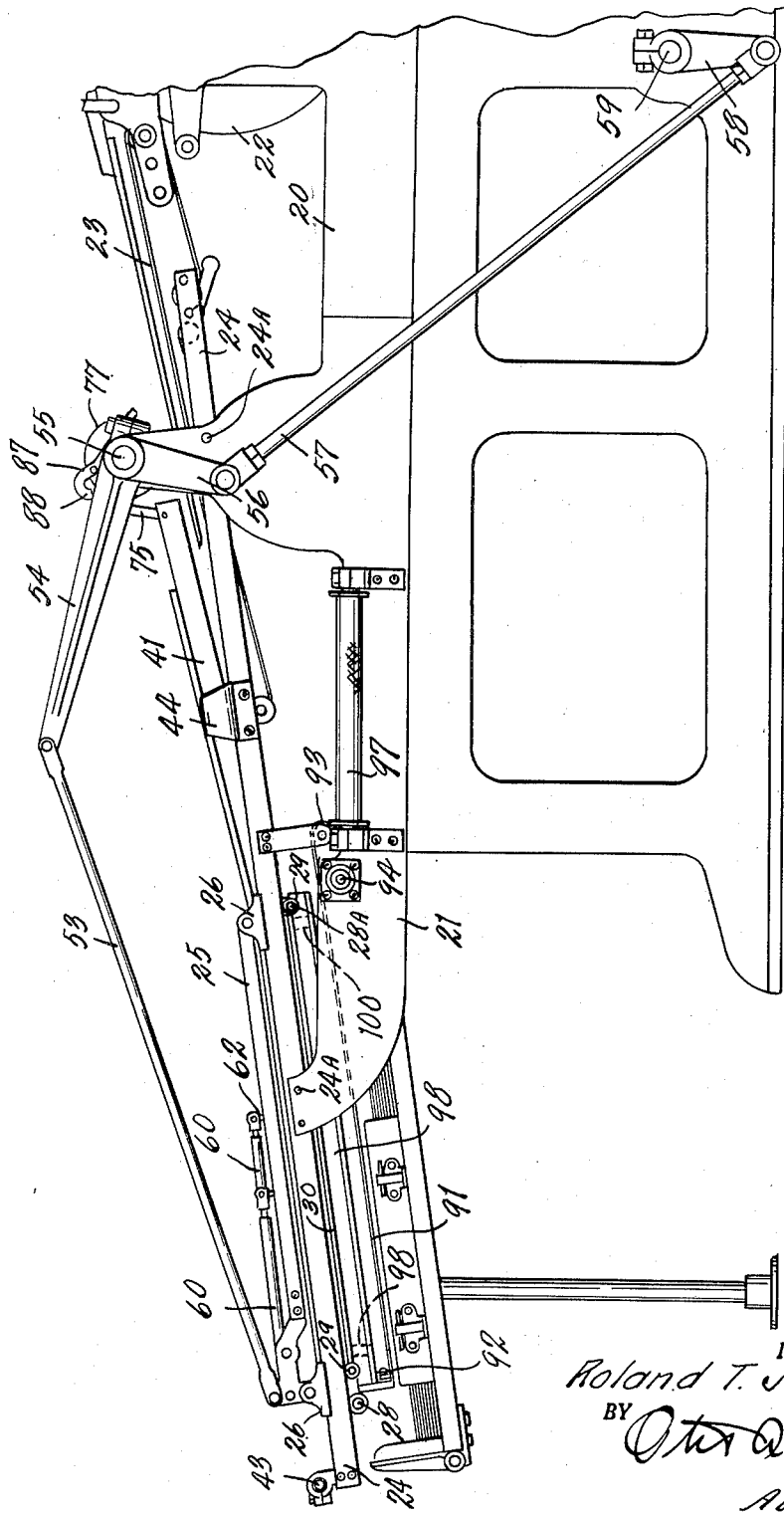

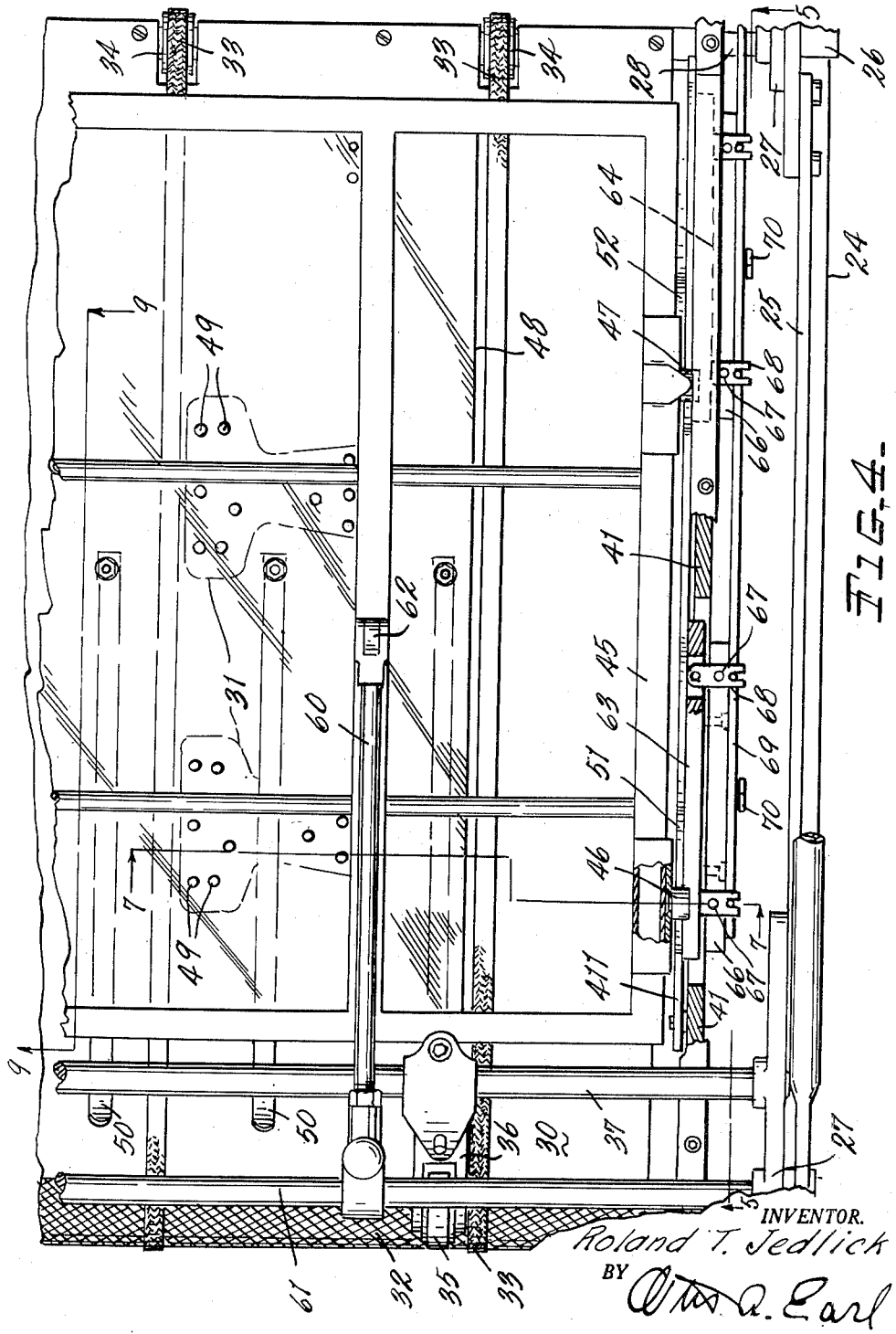

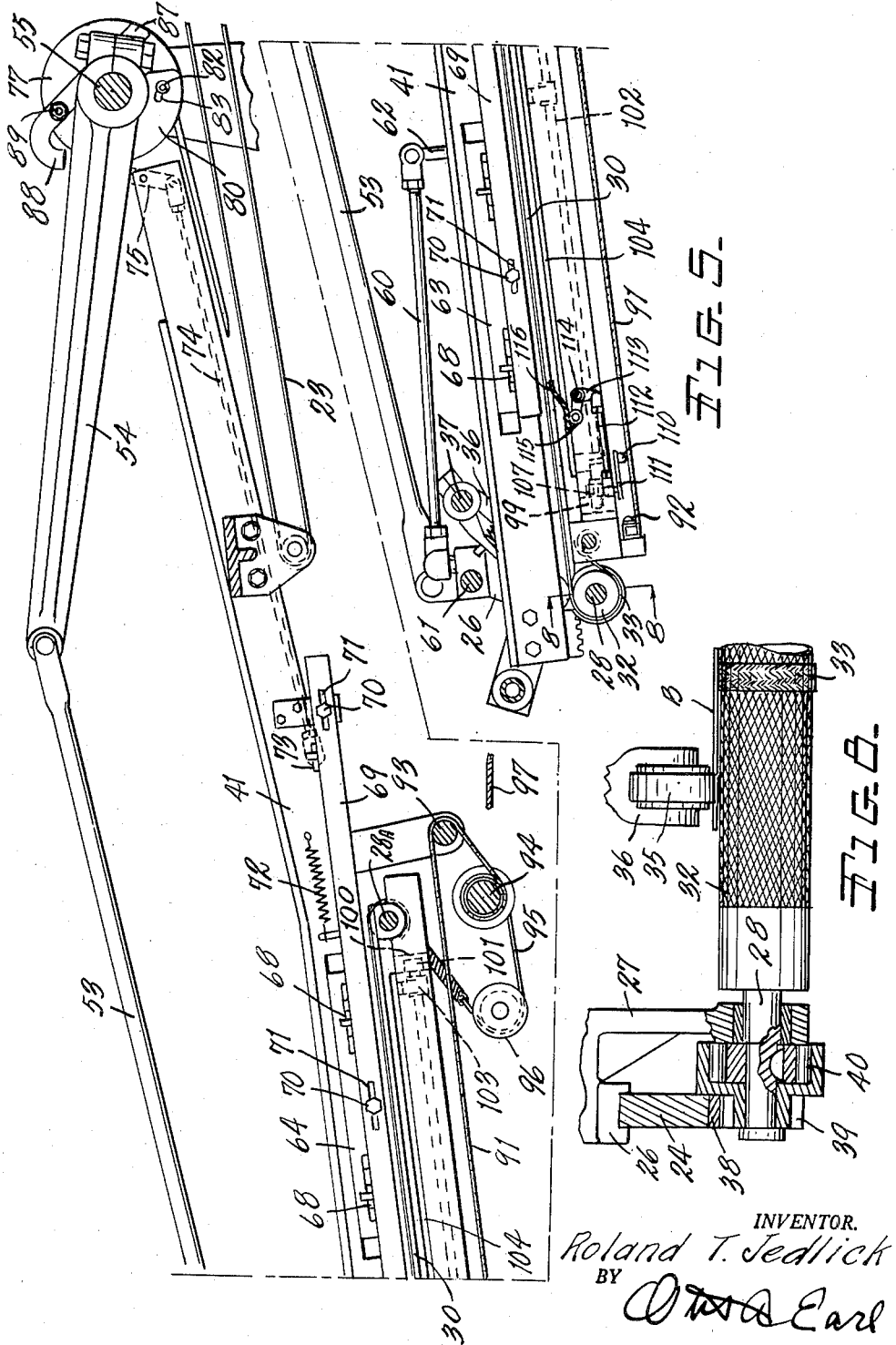

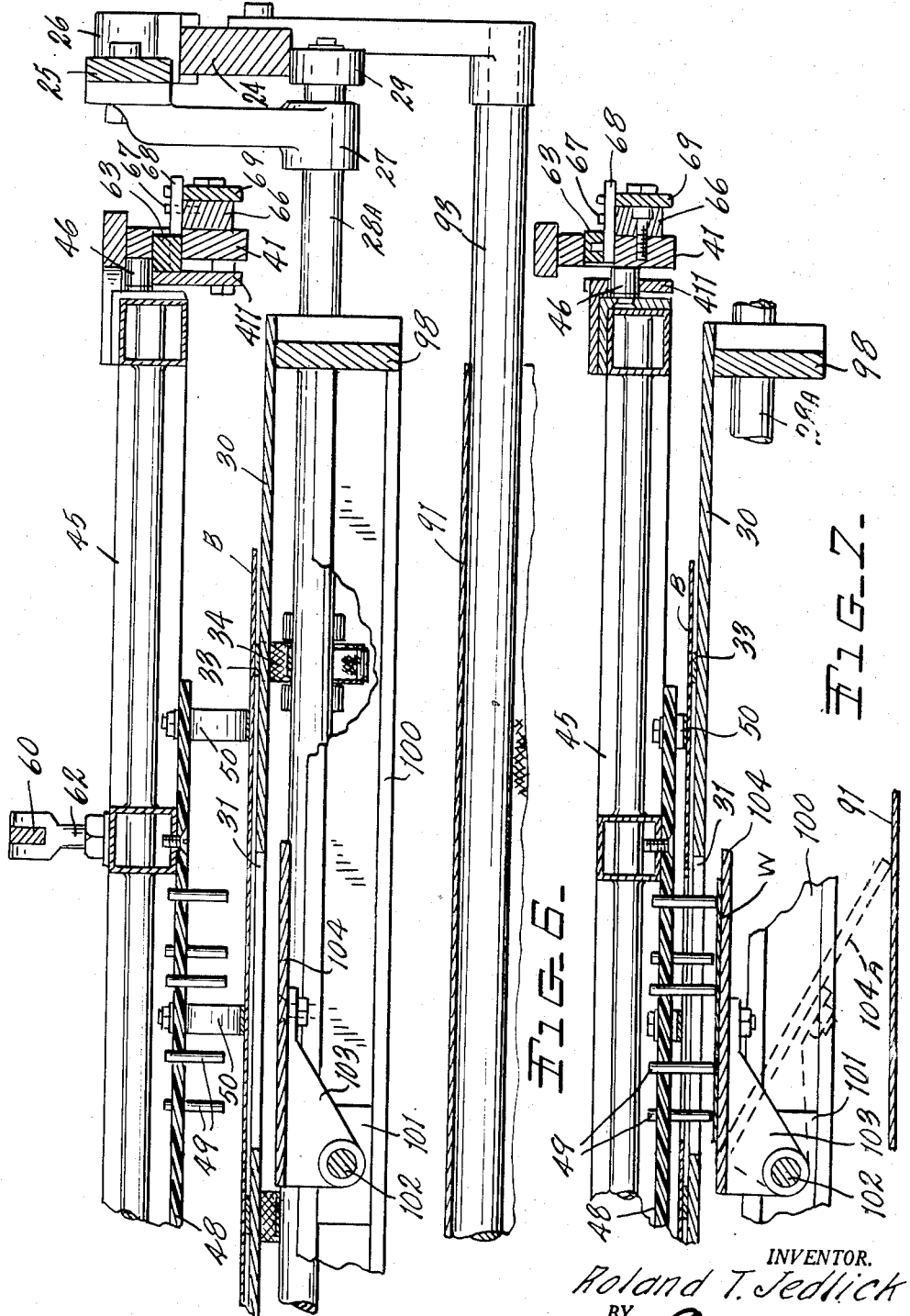

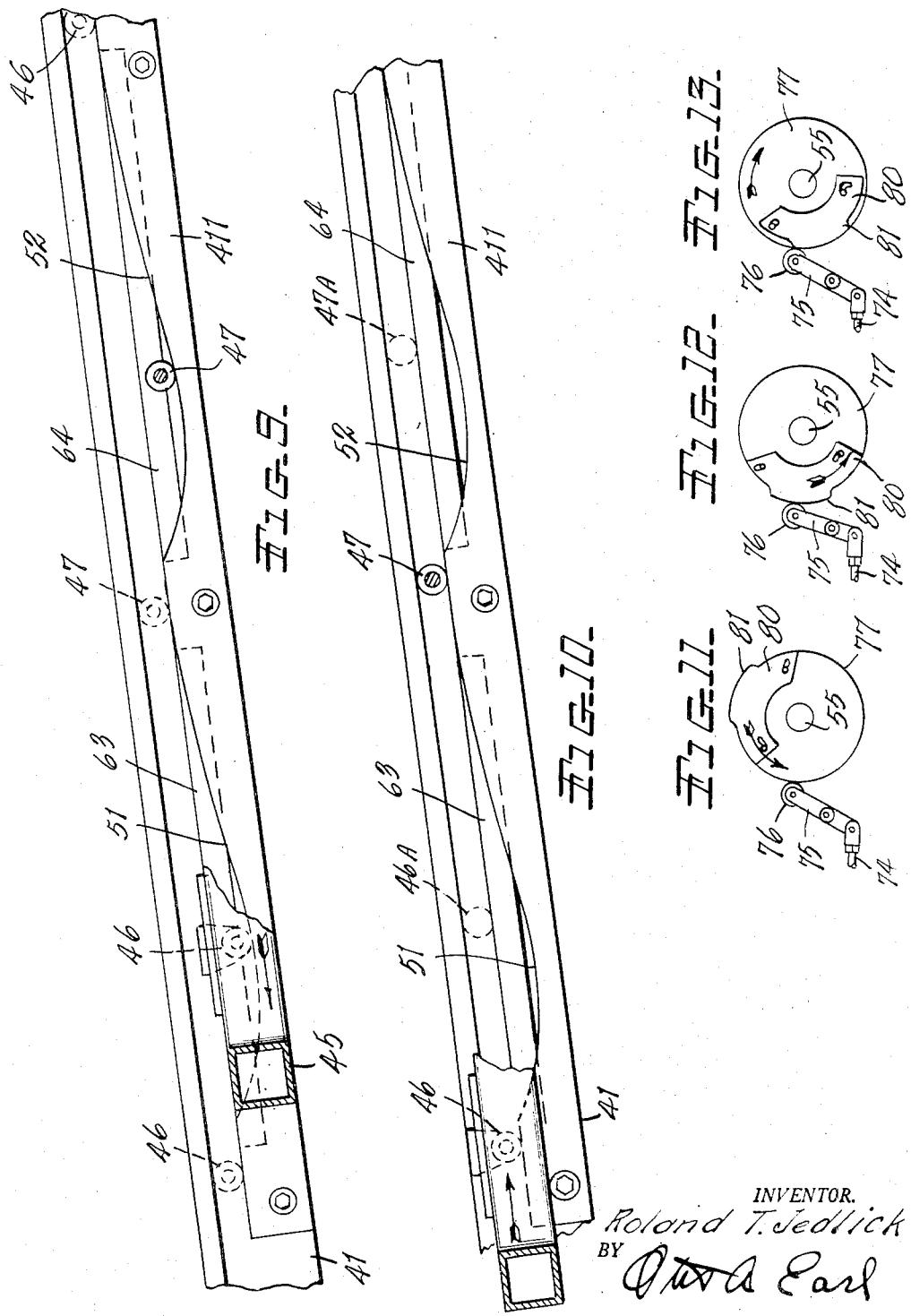

United States Patent Office 2,779,257
Patented Jan. 29, 1957

2,779,257

MACHINE FOR REMOVING WASTE SLUGS FROM CARTON BLANKS

Roland T. Jedlick, Chicago, Ill.

Application June 10, 1955, Serial No. 514,658

22 Claims. (Cl. 93—36)

This invention relates to improvements in a machine for removing waste slugs from carton blanks. The principal objects of this invention are:

First, to provide a machine having a reciprocable carton blank platform with slug receiving openings and a punch frame reciprocable both longitudinally with the platform and vertically in opening and closing relation to the platform to punch waste slugs through the openings in the platform with means for smoothly closing the punch member against the platform at a preselected point in the cycle of the movement of the platform and with backing plates swingably mounted closely below the platform to prevent slugs from clinging to one edge of the opening from which they are punched and swinging downwardly to pass the pins without completely severing the slugs from the blank.

Second, to provide a slug punching machine with means for rendering the slug punching frame inoperative when it is desired to advance blanks without punching slugs therefrom.

Third, to provide mechanism for controlling the movement of a slug punching frame that permits the frame to operate smoothly and at high speed without jerking or causing the frame to rebound.

Fourth, to provide a slug punching frame having a transparent panel which permits punch pins to be installed in visible relationship to a carton blank positioned underneath the frame.

Fifth, to provide generally parallel sets of rails for reciprocably supporting a blank support platform and a punch frame with one set of rails having gradually curved depressions to move the punch frame toward the platform and to further provide separately actuated bridge elements to bridge the depressions and hold the punch frame spaced from the blank platform at selected portions of the cycle of the platform and frame.

Sixth, to provide a novel form of actuating cam arranged to be driven by an oscillating drive member to operate only in one direction of movement of the cam and drive member.

Seventh, to provide pivotal supports for backing plates below the slug openings in a carton blank platform so that the plates may swing down to discharge the slugs after they are completely severed from the blank and to further provide drive connections for actuating the backing plates in timed relation to movement of the carton blank platform and the slug punching elements.

Other objects and advantages of the invention will be apparent from a consideration of the following description and claims. The drawings, of which there are seven sheets, illustrate a highly practical form of the slug punching machine.

Fig. 1 is a side elevational view of the slug punching machine in extended slug punching position.

Fig. 2 is a fragmentary top plan view of the machine. The structure shown in Fig. 2 is in retracted position to receive incoming carton blanks.

Fig. 3 is a fragmentary cross sectional view taken along the plane of the line 3—3 in Fig. 2 and illustrates the control cam which regulates the punch member for punching or non-punching operations.

Fig. 4 is an enlarged fragmentary top plan view of the machine with the slug punching frame in advanced position as in Fig. 1, but at the beginning of its retracting stroke, the support rail being broken away in horizontal section to show the operation of the punch frame supporting bridge elements.

Fig. 5 is a fragmentary enlarged vertical cross sectional view taken along the plane of the line 5—5 in Fig. 4.

Fig. 6 is a fragmentary transverse cross sectional view taken along the plane of the line 6—6 in Fig. 2 showing the slug punching frame in retracted and unclosed, non-punching relation.

Fig. 7 is a fragmentary transverse cross sectional view taken on the plane of the line 7—7 in Fig. 4 but showing the structure in advancing and closed slug punching position.

Fig. 8 is a fragmentary transverse cross sectional view taken along the plane of the line 8—8 in Fig. 5 and illustrating the drive connection to the off-feeding rolls that deliver the punched blank from the machine.

Fig. 9 is a fragmentary vertical longitudinal cross sectional view through the slug punching frame taken along the plane of the line 9—9 in Fig. 4 but showing the frame in advancing and lowering slug punching position.

Fig. 10 is a view similar to Fig. 9 but illustrating the punch in vertically retracted position.

Fig. 11 is a conventional side elevational view of the control cam and lever for the punch frame with the cam illustrated in fully retracted position ready to start its advance stroke.

Fig. 12 illustrates the cam shown in Fig. 11 in advanced position to retract the bridge elements that permit the slug punching frame to advance to operative position.

Fig. 13 is a view similar to Figs. 11 and 12 but illustrating the cam in fully advanced position and starting to retract.

Figure 14:
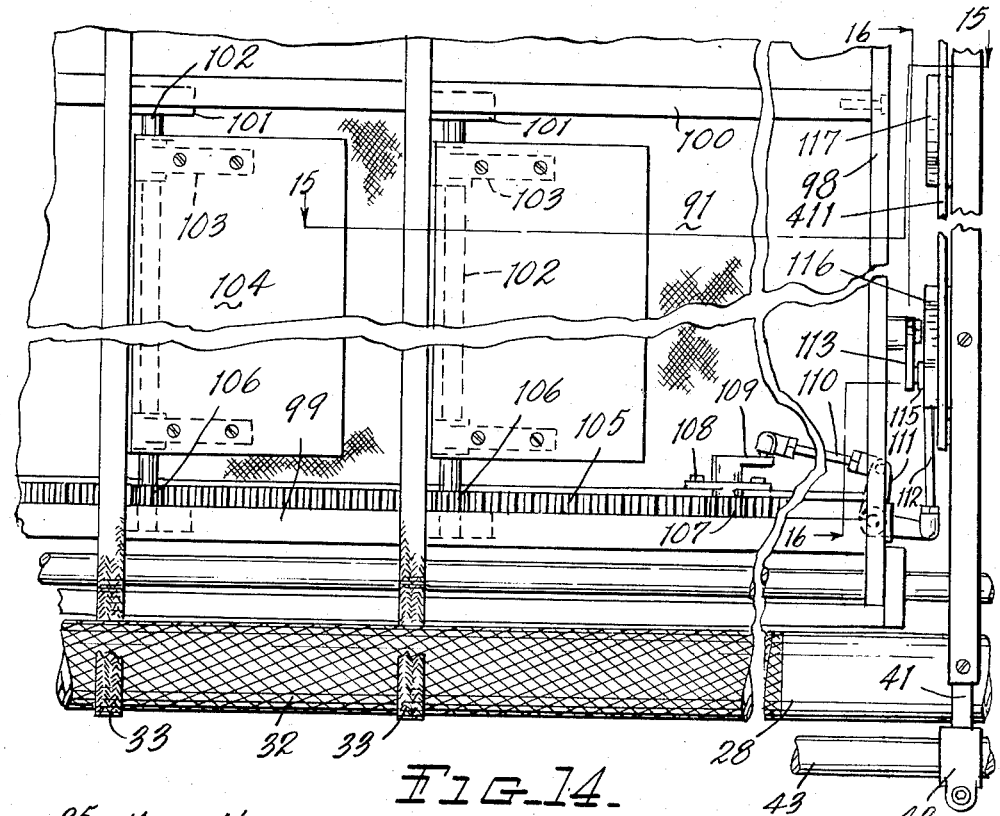
Fig. 14 is an enlarged fragmentary plan view similar to Fig. 4 but with the carton blank supporting panel and punch panel removed to illustrate the position and driving connections of the punch backing panels.

The present invention is an improvement on the slug punching machine disclosed in my copending application Serial No. 386,196 filed October 15, 1953, now U. S. Patent No. 2,759,402. Many of the elements and relationships of the present machine are described and claimed more fuuly in the copending application.

In the drawings the reference numeral 20 indicates the delivery end of a slug cutting machine adapted to cut and deliver flat carton blanks with non-usable waste slug areas cut therein. Extension frame members 21 support the slug punching mechanism to be described. The carton blacks are delivered from a final roll 22 of the machine to delivery conveyor belts 23. The belts 23 extend forwardly or outwardly from the cutting machine to above the retracted position of a punch platform as will be described presently. As is most clearly shown in Figs. 1, 2 and 6 a suitable arrangement of the slug punching mechanism includes fixed side rails 24 extending along the sides of the forwarding conveyor belts 23 and outwardly from the end thereof. The rails are connected to and supported by the frame extension 21 as at 24A. Slidably mounted on the rails 24 is a carriage having side bars 25 with supporting shoes 26 at their ends slidable on the rails 24. The side bars 25 of the carriage are connected by brackets 27 to cross shafts 28 and rollers 29 on the ends of the cross shafts ride along the bottoms of the rails 24 to prevent the carriage from jumping from the rails. The carriage includes a flat rigid platform 30 adapted to receive carton blanks as indicated at B from the forwarding conveyor belts 23. The platform 30 is apertured as at 31 to correspond to the shape of the waste slugs to be punched from the particular blank.

The cross shaft 28 at the outer end of the carriage 25 carries off-feeding roll 32 that is approximately flush with the platform 30. Belts 33 are trained around the off-feed roll 32 and idler rolls 34 on the front cross shaft 28A with the upper reaches of the belts sliding along the surface of the platform 30. Pressure rollers 35 are supported in coacting relation with the off-feeding roll by arms 36 secured to a cross bar 37 on the carriage. One of the fixed rails 24 has rack teeth 38 formed on the underside thereof (see Fig. 8), and the cross shaft 28 carries a pinion 39 engaged with the rack teeth. A one way clutch 40 connects the pinion with the off-feed roll 32 so that the roll rotates to feed carton blanks off of the forward end of the platform as the carriage retracts rearwardly to receiving position. On outward or advanced motion of the carriage the off-feeding roll 32 and belts 33 are not rotated due to the one way driving connection of the clutch 40.

Mounted in spaced relationship inwardly from the side rails 24 are support bars 41. The outer ends of the bars 41 are supported as at 42 on a fixed cross bar 43 of the frame of the machine and yoke like brackets 44 connected to the side rails 24 support the mid-portions of the bars while bridging the path of movement of the carriage supporting shoes 26. The bars 41 extend generally parallel to the outer ends of the rails 24 but are inclined upwardly at their inner ends over the delivery end of the forwarding conveyor 23 as is best shown in Figs. 1 and 5. The bars 41 support auxiliary rails 411 which support a rectangular punch frame 45 by means of rollers 46 and 47 that project from the outer and inner ends respectively of the punch frame. The punch frame 45 carries a punch pin board 48 on its under surface, which board is desirably made of transparent plastic so that the operator can look through the pin board to the platform 30 therebeneath. The punch pin board is provided with a plurality of holes into which punch pins 49 can be selectively positioned as illustrated to project through the openings 31 in the platform and punch waste slugs from the carton blank. Bowed spring fingers 50 secured to the bottom of the pin board engage the carton blank and hold it in position as the pins are projected through the platform as shown in Fig. 7.

The frame 45 and pin board 48 are moved vertically toward and away from the platform 30 by reason of recessed areas or notches 51 and 52 formed in the auxiliary rails 411 toward the outer ends thereof. The rollers 46 at the front of the punch frame operate in the recesses 51 while the rollers 47 operate in the recesses 52 as appears most clearly in Figs. 9 and 10.

The carriage 25 is reciprocated on the side rails 24 by connecting rods 53 that extend rearwardly to levers 54 secured to a drive shaft 55. The drive shaft 55 is oscillated in timed relationship with the blank cutting machine by means of the crank 56 and connecting rod 57 that extend to a second crank 58 on a shaft 59 of the press. (See Fig. 1.) The punch frame 45 is simultaneously reciprocated with the carriage 25 by connecting rods 60 extending from a front cross bar 61 of the carriage rearwardly to pins 62 on the punch frame. It is pointed out that the connections to the punch frame are easily removed when it is desired to substitute a different frame and pin board on the machine and punch carton blanks having different shapes and locations of waste slug areas.

The vertical motion of the punch frame 45 into and out of slug punching relation with the platform 30 results from movement of the rollers 46 and 47 into the curved recesses 51 and 52 of the auxiliary rails 41 as was previously described. In order to control this movement to the proper time in the cycle of longitudinal motion of the punch frame and platform the recesses 51 and 52 are adapted to be blocked or bridged by bridge members 63 and 64. As most clearly appears in Figs. 4, 6, 7, 9 and 10, the bridge members 63 and 64 consist of bars that are supported in longitudinal slots in the support bars 41 positioned along side the outer sides of the auxiliary rails 411. The sides of the support bars 41 carry extension blocks 66 having pivot pins 67 projecting upwardly therefrom. The blocks and pins support a plurality of levers 68 having their inner ends pivoted to the adjacent bridge member as in Fig. 7 so that swinging motion of the levers 68 to perpendicular relationship to the support bars will project the bridge members (as in Fig. 6) inwardly against the auxiliary rails where they will bridge the notches 51 and 52 and support the rollers 46 and 47 to carry the punch frame 45 over the notches. Swinging the levers 68 to oblique positions retracts the bridge members as shown in Fig. 7 and permits the rollers to descend into the notches. The several levers are swung simultaneously by means of control rods 69 that are slidably mounted on the outer sides of the extension blocks 66. The control rods 69 are limited in their longitudinal motion by screws 70 passed through slots 71 in the control rods. (See Fig. 5.) The control rods are biased inwardly or rearwardly toward the blank delivery machine by springs 72 in which position the levers 68 are perpendicular to the auxiliary rails and the bridging members 63 and 64 are extended in operative bridging position.

The control rods 69 are actuated by levers 73 that extend through the support bars 65 and are connected at their inner ends to push rods 74. The push rods 74 extend rearwardly to levers 75 pivoted on the inner ends of the auxiliary rails and having cam followers 76 on their upper ends. The cam followers 76 coact with cam wheels 77 secured to the drive shaft 55. The construction of the cam wheel is more clearly shown in Fig. 3.

The cam wheels 77 consist of two complementary halves 78 and 79 which can be clamped around the shaft 55 in any angularly adjusted position. The wheel half 78 carries an arcuate cam plate 80 having a radially projecting cam lift 81 on its periphery. The cam plate 80 is permitted to slide radially inwardly and tangentially with respect to the cam wheel by reason of the location of the retaining pins 82 in the radially extending slots 83. A spring 84 housed in an angularly disposed slot 85 in the cam wheel engages a pin 86 on the cam plate and constantly biases the cam plate radially outwardly and tangentially of the cam wheel. It will be noted that pressure of the cam follower 76 on the cam lift 81 acts in the same direction as the pressure of spring 84 and the cam plate is prevented from collapsing inwardly of the cam wheel by engagement of the pins 82 in the bottoms of the slots 83 when the cam wheel is rotated forwardly against the cam follower. However, when the cam lift 81 has rotated past the cam follower, reverse rotation of the cam wheel directs the pressure of the cam follower against the rear end of the cam plate and the cam plate is permitted to collapse inwardly of the cam wheel thus rendering the cam lift 81 ineffective upon return rotation of the cam wheel. Figs. 11, 12 and 13 illustrate the several relative operating positions of the cam wheel and the cam plate. Whenever it is desired to render the cam lifts 81 inoperative, it is only necessary to pull the levers 87 outwardly from the cam wheels 77 so that the hooked nose 88 presses the cam plate inwardly of the cam wheel. The levers 87 are pivotally mounted on the other halves of the cam wheels 77 as at 89 and carry locking pawls 90 that are swingable into engagement with the adjacent shaft 55 to hold the locking members in locked position.

As most clearly appears in Figs. 9 to 13 the cam lifts 81 are positioned in angularly spaced relation from the cam followers 76 at the start of the advancing motion of the cam wheels and the carriage 25. The bridge members 63 and 64 are then held in inwardly extended bridging position by the springs 72 as the leading rollers 46 on the punch frame advance across the rear recesses 52. Further rotation of the cam wheels 77 to the position shown in Fig. 12 brings the cam lifts 81 into operation to retract the bridge members while the leading rollers 46 descend into the recesses 51 and the trailing rollers 47 descend into the recesses 52 as shown in Fig. 9. As the rollers move upwardly along the lower or outer ends of the recesses 51 and 52 the punch pins 49 clear the platform 30 and the punched blank B and the cam lift 81 moves past the cam follower 76 to the position illustrated in Figs. 10 and 13. At this point the bridge members 63 and 64 are moved inwardly by the springs 72 and on retracting motion of the punch frame the rollers travel over the bridge members as indicated by the dotted lines at 46A and 47A in Fig. 10. Retracting inward motion of the carriage 25 causes the off-feed roll 32 to be operated by the one way clutch 40 to move the punched blank over the retracting outer end of the carriage as was previously described. The carriage therefore retracts to receiving a succeeding blank from the infeeding conveyor belts 23 and the punch frame 45 retracts above the belts 23 along the inclined inner ends of the rails 41 so as not to interfere with delivery of the new blank.

The gradually curved contour of the recesses 51 and 52 in the auxiliary rails is important to the smooth functioning of the machine because it permits the rollers 46 and 47 to descend gradually during advancing motion of the punch frame. Thus even though the machine is operated rapidly and the punch frame reciprocated at high speed, the rollers will not leave the auxiliary rails and then strike with a shock on the bottoms of the recesses. The levers and operating links that actuate the bridge members 63 and 64 are smoothly actuated by the cam wheels 77 independently of the reciprocating motion of the carriage and punch frame so the bridge actuating mechanism is not subject to shock or liable to get out of adjustment.

As in the previous machine disclosed in my copending application, the slugs W punched from the blanks are collected on a flexible apron 91 that is connected at its outer end to the outer end of the carriage as at 92 and trained over a fixed idler roll 93 to a takeup roll 94 positioned just inwardly of the retracted position of the outer end of the carriage. A cable 95 connected to the inner end of the carriage (see Fig. 5) is trained around an idler pulley 96 and wrapped around the takeup roll 94 to wind up the takeup roll as the carriage 25 and the apron 91 are retracted. The waste slugs on the apron 91 are therefore thrown onto a cross belt 97 for delivery to the side of the machine.

The improvements in the foregoing structure over that disclosed in my copending application relate primarily to the smoothness and ease of operation of the slug punching mechanism. The slug punching operation is performed on the carton blanks in much the the same manner as in the copending application. Reference is now made to an improvement and addition to the slug punching mechanism which makes the separation of the slugs from the carton blanks more positive and thus prevents jamming of the machine by partially severed waste slugs and permits the carton blanks to be connected to the waste slugs by narrow uncut connecting sections of the blank to prevent the slugs from falling out of the blank prematurely as when the blanks are being delivered by the feed belts 23. Attention is particularly directed to Figs. 1, 5 to 7 and 14 to 16. It will there be noted that the carriage on which the blank supporting panel 30 is supported is provided with side members 98 disposed below the blank supporting panel and that the side members are interconnected by a forward cross bar 99 and a rear cross bar 100. The cross bars 99 and 100 are provided with bearing blocks 101 rotatably supporting rock shafts 102 that extend longitudinally along the carriage. The rock shafts 102 are spaced transversely across the carriage and to one side of the lines of apertures 31 in the blank supporting panel through which the waste slugs are pressed. Triangular brackets 103 on the rock shafts support backing plates 104. In the raised horizontal portion of the backing plates the plates are located in closely spaced relation below the lowermost position of the punch pins 49. As appears more clearly in Fig. 7 the waste slug W is thus pressed downwardly by the punch pins 49 and the backing plate 104 prevents one edge of the waste slug from tilting downwardly and permitting the punch pins to slide past the slug while one edge of the slug remains hingedly connected to the carton blank. Complete separation of the waste slug from the carton blank is thus assured.

Figure 15:
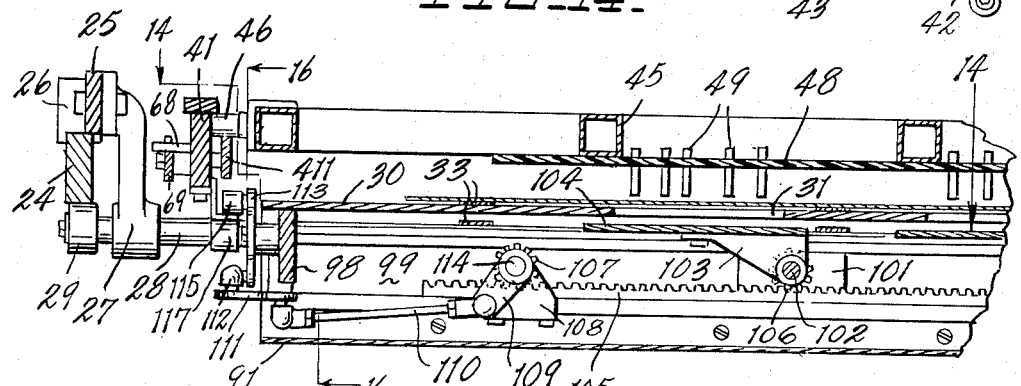
Fig. 15 is a fragmentary transverse cross sectional view taken along the plane of the line 15—15 in Fig. 14 and showing the carton blank support panel and the punch panel in operative relation to the backing panels.
Figure 16:
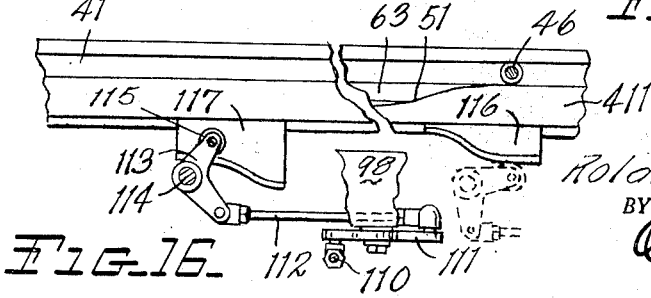
Fig. 16 is a fragmentary cross sectional view along the plane of the line 16—16 in Fig. 15 illustrating the driving connection to the backing panel operating mechanism.

In order to discharge the waste slugs from the backing plates 104 the rear cross member 99 of the carriage is provided with an upwardly facing rack 105 (see Figs. 14 and 15). The rack 105 is slidable on the cross member and the rock shafts 102 are provided with pinions 106 engaged with the rack so that reciprocation of the rack swings the backing plates 104 from the full line horizontal position illustrated to the inclined discharge position shown in dotted lines at 104A in Fig. 7. The rack 105 is reciprocated by a pinion 107. The pinion 107 is connected to a shaft journaled in the bracket 108 and the shaft has a crank arm 109 on its forward end. The crank is connected by the connecting rod 110 to one arm of a bell crank 111 pivoted on the bottom of one of the side members 98 of the carriage. The other arm of the bell crank 111 is connected by a second connecting rod 112 to a lever 113 pivoted on the side member 98 as at 114. The lever 113 carries a tappet 115 that reciprocates with the carriage and engages a cammed stop 116 on the fixed support bar 65 near the end of the advancing motion of the carriage. Thus after the waste slugs have been punched and deposited on the backing plates 104 the roller 115 strikes the cam stop 116 to actuate the several levers, connecting rods and bell cranks to shift the rack bar 105 and tilt the backing plates 104. The waste slugs then fall by gravity to the collecting apron 91 and are disposed of as previously described. A reversely operating stop cam 117 positioned toward the inner or rear end of the support bar 65 reversely actuates the lever 112 to return the backing panels to horizontal position prior to a succeeding punching operation.

The improvements in the slug punching machine eliminate the chance of damage due to vibration and shock of rapidly reciprocated parts and eliminate the chance of jamming due to incompletely severed waste slugs. It is thus practical to operate the machines at high rates of speed so that the machine will produce more stripped carton blanks than the machine originally disclosed in the copending application referred to.

Having thus described the invention, what is claimed to be new and is desired to be secured by Letters Patent is:

1. A slug punching machine in combination with a press adapted to deliver single blanks with slug areas partially cut therefrom, said machine comprising side rails extending outwardly from the delivery end of said press, a carriage supported on said rails and movable outwardly thereon from said press and inwardly below the delivery end of the press to receive blanks therefrom, a platform on said carriage having apertures formed therein to pass slugs punched from said slug areas, an off-feeding roll at the outer end of said carriage, rack teeth on one of said rails, a gear engaged with said teeth and having one way driving connection to said roll to feed blanks off the outer end of said platform on inward movement of said carriage, feed belts trained over said roll and said platform to feed blanks to said roll, a pressure roll on said carriage coacting with said off-feed roll, a drive lever oscillated with each cycle of said press and connected by a rod to said carriage to reciprocate the carriage, a flexible collecting apron secured to the outer end of said carriage below said platform, an idler roll positioned below the inner end of said carriage at the outer limit of movement of the carriage and over which said apron is trained, a take up roll connected to be rotated by movement of the carriage and having the other end of the apron wound thereon, other rails extending parallel to the outer portions of said first rails and inclined upwardly at their inner ends over the delivery end of said press, a frame slidable on said other rails and drivingly connected to said carriage for reciprocation therewith, a transparent punch panel carried by said frame over said carriage, slug punching pins on said panel and projecting therebelow, said panel having rollers at its inner and outer ends engaged with said other rails, said other rails having downwardly then upwardly curved depressions in their upper surfaces to lower said rollers and said panel toward said platform on said carriage, bridge bars mounted alongside of said other rails and movable transversely with respect thereto into bridging relation with said depressions to support said rollers across said depressions, pivoted levers connected to said bridge bars, shift rods reciprocable longitudinally of said other rails and connected to the other ends of said pivoted levers to advance and retract said bridge bars, wheels oscillatable with said drive lever, cams slidably mounted on said wheels and yieldably biased tangentially thereof to projecting position, cam followers engaged with said wheels and cams and connected to said shift rods to move said bridge bars to retracted non-bridging relation to the recesses in said other rails on part of the forward motion of said carriage, spring means biasing said bridge bars to extended bridging position, said cams being retractable to inoperative position under the influence of said followers on the retracting stroke of said carriage, rock shafts rotatably mounted under said panel and extending longitudinally of said carriage to one side of the slug holes in the platform, backing plates carried by said rock shafts and swingable thereby between horizontal positions closely spaced below the lower limit of travel of said punch pins and downwardly inclined positions over said apron, a rack bar slidably mounted on said carriage and coacting pinions on said rock shafts to rock said shafts and coacting levers and tappets on said carriage and rails to reciprocate said rack bar in response to movement of said carriage.

2. A slug punching machine in combination with a press adapted to deliver single blanks with slug areas cut therein, said machine comprising side rails extending outwardly from the delivery end of said press, a carriage supported on said rails and movable outwardly thereon from said press and inwardly below the delivery end of the press to receive blanks therefrom, a platform on said carriage having apertures formed therein to pass slugs punched from said slug areas, an off-feeding roll at the outer end of said carriage, rack teeth on one of said rails, a gear engaged with said teeth and having a one way driving connection to said roll to feed blanks off the outer end of said platform on inward movement of said carriage, a pressure roll on said carriage coacting with said off-feed roll, a drive lever oscillated with each cycle of said press and connected by a rod to said carriage to reciprocate the carriage, other rails extending parallel to the outer portions of said first rails and inclined upwardly at their inner ends over the delivery end of said press, a frame slidable on said other rails and drivingly connected to said carriage for reciprocation therewith, a transparent punch panel carried by said frame over said carriage, slug punching pins on said panel and projecting therebelow, said panel having rollers at its inner and outer ends engaged with said other rails, said other rails having downwardly then upwardly curved depressions in their upper surfaces to lower said rollers and said panel toward said carriage and said platform, bridge bars mounted alongside of said other rails and movable transversely with respect thereto into bridging relation with said depressions to support said rollers across said depressions, pivoted levers connected to said bridge bars, shift rods reciprocable longitudinally of said other rails and connected to said pivoted levers to advance and retract said bridge bars, wheels oscillatable with said drive lever, cams slidably mounted on said wheels and yieldably biased tangentially thereof to projecting position, cam followers engaged with said wheels and cams connected to said shift rods to move said bridge bars to retracted non-bridging relation to the recesses in said other rails on part of the forward motion of said carriage, spring means biasing said bridge bars to extended bridging position, said cams being retractable to inoperative position under the influence of said followers on the retracting stroke of said carriage, rock shafts rotatably mounted on said carriage under said platform and extending longitudinally thereof to one side of said slug apertures in the platform, backing plates carried by said rock shafts and swingable thereby between horizontal positions closely spaced below the lowermost positions of said pins and inclined discharge positions, and means including coacting tappets on said carriage and said side rails for rocking said shafts to tilt said plates at the end of the forward stroke of the carriage and return said plates to horizontal position at the end of the retracting stroke of the carriage.

3. A slug punching machine in combination with a press adapted to deliver single blanks with slug areas cut therein, said machine comprising side rails extending outwardly from the delivery end of said press, a carriage supported on said rails and movable outwardly thereon from said press and inwardly below the delivery end of the press to receive blanks therefrom, a platform on said carriage having apertures formed therein to pass slugs punched from said slug areas, a drive lever oscillated with each cycle of said press and connected by a rod to said carriage to reciprocate the carriage, other rails extending parallel to the outer portions of said first rails and inclined upwardly at their inner ends over the delivery end of said press, a frame slidable on said other rails and drivingly connected to said carriage for reciprocation therewith, a transparent punch panel carried by said frame over said carriage, slug punching pins on said panel and projecting therebelow, said panel having rollers at its inner and outer ends engaged with said other rails, said other rails having downwardly then upwardly curved depressions in their upper surfaces to lower said rollers and said panel toward said carriage and said platform, bridge bars mounted alongside of said other rails and movable transversely with respect thereto into bridging relation with said depressions to support said rollers across said depressions, pivoted levers connected to said bridge bars, shift rods reciprocable longitudinally of said other rails and connected to the other ends of said pivoted levers to advance and retract said bridge bars, wheels oscillatable with said drive lever, cams slidably mounted on said wheels and yieldably biased tangentially and radially thereof to projecting position, cam followers engaged with said wheels and cams and connected to said shift rods to move said bridge bars to retracted non-bridging relation to the depressions in said other rails on part of the forward motion of said carriage, and spring means biasing said bridge bars to extended bridging position, said cams being retractable to inoperative position under the influence of said followers on the retracting stroke of said carriage.

4. A slug punching machine in combination with a press adapted to deliver single blanks with slug areas cut therein, said machine comprising side rails extending outwardly from the delivery end of said press, a carriage supported on said rails and movable outwardly thereon from said press and inwardly below the delivery end of the press to receive blanks therefrom, a platform on said carriage having apertures formed therein to pass slugs punched from said slug areas, a drive lever oscillated with each cycle of said press and connected by a rod to said carriage to reciprocate the carriage, other rails extending parallel to the outer portions of said first rails and inclined upwardly at their inner ends over the delivery end of said press, a frame slidable on said other rails and drivingly connected to said carriage for reciprocation therewith, a punch panel carried by said frame over said carriage, slug punching pins on said panel and projecting therebelow, said panel having rollers at its inner and outer ends engaged with said other rails, said other rails having downwardly then upwardly curved depressions in their upper surfaces to lower said rollers and said panel toward said carriage and said platform, bridge bars mounted alongside of said other rails and movable transversely with respect thereto into bridging relation with said depressions to support said rollers across said depressions, shift means connected to said bridge bars, shift rods reciprocable longitudinally of said other rails and connected to said shift means to advance and retract said bridge bars, wheels oscillatable with said drive lever, cams slidably mounted on said wheels and yieldably biased tangentially and radially thereof to projecting position, cam followers engaged with said wheels and cams and connected to said shift rods to move said bridge bars to retracted non-bridging relation to the depressions in said other rails on part of the forward motion of said carriage, means biasing said bridge bars to extended bridging position, said cams being retractable to inoperative position under the influence of said followers on the retracting stroke of said carriage, backing plates pivotally mounted on said carriage below said platform and swingable about longitudinally extending axis between horizontal positions closely spaced below the lowermost positions of said pins and inclined discharge positions, and means including coacting tappets on said carriage and said side rails for tilting said plates at the end of the advancing stroke of said carriage and returning the plates to horizontal position on the retracting stroke of the carriage.

5. A slug punching machine in combination with a press adapted to deliver blanks with slug areas cut therein, said machine comprising side rails extending outwardly from the delivery end of said press, a carriage supported on said rails and movable outwardly thereon from said press and inwardly below the delivery end of the press to receive blanks therefrom, a platform on said carriage having apertures formed therein to pass slugs punched from said slug areas, a drive lever oscillated with each cycle of said press and connected to said carriage to reciprocate the carriage, other rails extending parallel to the outer portions of said first rails and inclined upwardly at their inner ends over the delivery end of said press, a frame slidable on said other rails and drivingly connected to said carriage for reciprocation therewith, a transparent punch panel carried by said frame over said carriage, slug punching pins on said panel and projecting therebelow, said panel having rollers at its inner and outer ends engaged with said other rails, said other rails having downwardly then upwardly curved depressions in their upper surfaces to lower said rollers and said panel toward said carriage and said platform, bridge bars mounted alongside of said other rails and movable transversely with respect thereto into bridging relation with said depressions to support said rollers across said depressions, shift means connected to said bridge bars, shift rods reciprocable longitudinally of said other rails and connected to said shift means to advance and retract said bridge bars, cams driven in timed relation to said carriage, cam followers engaged with said cams and connected to said shift rods to move said bridge bars to retracted non-bridging relation to the recesses in said other rails on part of the forward motion of said carriage, and spring means biasing said bridge bars to extended bridging position.

6. A slug punching machine in combination with a press adapted to deliver blanks with slug areas cut therein, said machine comprising side rails extending outwardly from the delivery end of said press, a carriage supported on said rails and movable outwardly thereon from said press and inwardly below the delivery end of the press to receive blanks therefrom, a platform on said carriage having apertures formed therein to pass slugs punched from said slug areas, means oscillated with each cycle of said press and connected to said carriage to reciprocate the carriage, other rails extending parallel to the outer portions of said first rails and inclined upwardly at their inner ends over the delivery end of said press, a frame slidable on said other rails and drivingly connected to said carriage for reciprocation therewith, a punch panel carried by said frame over said carriage, slug punching pins on said panel and projecting therebelow, said panel having rollers at its inner and outer ends engaged with said other rails, said other rails having downwardly then upwardly curved depressions in their upper surfaces to lower said rollers and said panel toward said carriage and said platform, bridge bars mounted alongside of said other rails and movable transversely with respect thereto into bridging relation with said depressions to support said rollers across said depressions, shift means connected to said bridge bars, shift rods reciprocable longitudinally of said other rails and connected to said shift means to advance and retract said bridge bars, cams driven in timed relation to said carriage, cam followers engaged with said cams and connected to said shift rods to move said bridge bars to retracted non-bridging relation to the recesses in said other rails on part of the forward motion of said carriage, a backing plate pivotally supported below the slug apertures in said platform, and means on said carriage connected to tilt said plate, said tilting means being arranged to tilt said plate to inclined position after said pins have punched slugs through said apertures and to raise said plate to horizontal position closely spaced below the lowermost position of said pins prior to lowering of the pins.

7. In a slug punching machine having a blank supporting platform and a punch frame reciprocable in registered lapped relation, a first set of rails supporting said platform, a second set of rails supporting said frame, rollers at the front and rear of said punch frame coacting with said second rails, said second rails having front and rear gradually reversely curved depressions toward the front ends thereof arranged to simultaneously receive said rollers and lower said punch frame into coacting punching relation to said platform, support bars extending alongside said second rails and having transversely opening slots opposite said depressions, bridge bars slidable in said slots, levers pivoted on said support bars and connected to said bridge bars to extend the bridge bars into bridging relation to said depressions, shift rods connected to simultaneously shift said levers, wheels oscillated in timed relation with said platform and frame, cams slidably supported on said wheels and yieldably urged to projecting position beyond said wheels, and cam followers connected to said shift rods and engaged with said wheels and cams, said cams being retractable radially inwardly of the wheels against the biasing force on the cams by the force of the followers applied to the cams in one direction only of rotation of the cams whereby the cams retract said bridge bars to permit said rollers to simultaneously enter said depressions on the advancing stroke of said platform and said frame.

8. In a slug punching machine having a blank supporting platform and a punch frame reciprocable in registered lapped relation, a first set of rails supporting said platform, a second set of rails supporting said frame, rollers at the front and rear of said punch frame coacting with said second rails, said second rails having front and rear depressions toward the front ends thereof arranged to simultaneously receive said rollers and lower said punch frame into coacting punching relation to said platform, support bars extending alongside said second rails and having transversely opening slots opposite said depressions, bridge bars slidable in said slots, shift means on said support bars and connected to said bridge bars to extend the bridge bars into bridging relation to said depressions, shift rods connected to simultaneously shift said shift means, wheels oscillated in timed relation with said platform and frame, cams slidably supported on said wheels and yieldably urged to projecting position beyond said wheels, and cam followers connected to said shift rods and engaged with said wheels and cams, said cams being retractable radially inwardly of the wheels against the biasing force on the cams by the force of the followers applied to the cams in one direction only whereby the cams retract said bridge bars to permit said rollers to simultaneously enter said depressions on the advancing stroke of said platform and said frame.

9. In a slug punching machine having a blank supporting platform and a punch frame reciprocable in registered lapped relation, a first set of rails supporting said platform, a second set of rails supporting said frame, rollers at the front and rear of said punch frame coacting with said second rails, said second rails having front and rear gradually reversely curved depressions toward the front ends thereof arranged to simultaneously receive said rollers and lower said punch frame into coacting punching relation to said platform, bridge bars extending alongside said second rails and movable transversely with respect thereto, means connected to said bridge bars to extend the bridge bars into bridging relation to said depressions, shift rods connected to simultaneously shift said means and biased to bridge advancing position, wheels oscillated in timed relation with said platform and frame, cams slidably supported on said wheels and yieldably urged to projecting position beyond said wheels, and cam followers connected to said shift rods and engaged with said wheels and cams, said cams being retractable radially inwardly of the wheels against the biasing force on the cams by the force of the followers applied to the cams in the reverse rotation only of the cams whereby the cams retract said bridge bars on advance rotation to permit said rollers to simultaneously enter said depressions on the advancing stroke of said platform and said frame and the shift rod biasing force advances the bridge bars to bridging relation and retracts said cams on reverse rotation of the wheels.

10. In a slug punching machine having a blank supporting platform and a punch frame reciprocable in registered lapped relation, a first set of rails supporting said platform, a second set of rails supporting said frame, carriers at the front and rear of said punch frame coacting with said second rails, said second rails having front and rear inclined depressions toward the front ends thereof arranged to simultaneously receive said carriers and lower said punch frame into coacting punching relation to said platform, bridge bars extending alongside said second rails and movable transversely with respect thereto, means connected to said bridge bars to extend the the bridge bars into bridging relation to said depressions, shift rods connected to simultaneously shift said means and biased to bridge advancing position, wheels oscillated in timed relation with said platform and frame, cams slidably supported on said wheels and yieldably urged to projecting position beyond said wheels, and cam followers connected to said shift rods and engaged with said wheels and cams, said cams being retractable radially inwardly of the wheels against the biasing force on the cams by the force of the followers applied to the cams in the reverse rotation only of the cams whereby the cams retract said bridge bars on advance rotation to permit said carriers to simultaneously enter said depressions on the advancing stroke of said platform and said frame and the shift rod biasing force advances the bridge bars to bridging relation and retracts said cams on reverse rotation of the wheels.

11. In a slug punching machine having a blank supporting platform and a punch frame reciprocable in registered lapped relation, a first set of rails supporting said platform, a second set of rails supporting said frame, carriers at the front and rear of said punch frame coacting with said second rails, said second rails having front and rear double inclined depressions located toward the front ends thereof arranged to simultaneously receive said carriers and lower said punch frame into coacting punching relation to said platform, support bars extending alongside said second rails and having transversely opening slots opposite said depressions, bridge bars slidable in said slots, shift means on said support bars and connected to said bridge bars and biased to extend the bridge bars into bridging relation to said depressions, shift rods connected to simultaneously shift said shift means, cams oscillated in timed relation with said platform and frame and yieldably urged to projecting operative position, and cam followers connected to said shift rods and engageable with said cams, said cams being retractable against the biasing force on the cams by the force of the followers applied to the cams in one direction only whereby the cams retract said bridge bars to permit said carriers to simultaneously enter said depressions on the advancing stroke of said platform and said frame and are retracted by the followers on reverse movement of the cams.

12. In a slug punching machine having a blank supporting platform and a punch frame reciprocable in registered lapped relation, a first set of rails supporting said platform, a second set of rails supporting said frame, carriers at the front and rear of said punch frame coacting with said second rails, said second rails having front and rear double inclined depressions located toward the front ends thereof arranged to simultaneously receive said carriers and lower said punch frame into coacting punching relation to said platform, support bars extending alongside said second rails and having transversely opening slots opposite said depressions, bridge bars slidable in said slots, shift means connected to said bridge bars and biased to extend the bridge bars into bridging relation to said depressions, shift rods connected to simultaneously shift said shift means, cams oscillated in timed relation with said platform and frame, and cam followers connected to said shift rods and engageable with said cams whereby the cams retract said bridge bars to permit said carriers to simultaneously enter said depressions on the advancing stroke of said platform and said frame.

13. A slug punching machine in combination with a press adapted to deliver single blanks with slug areas cut therein, said machine comprising side rails extending outwardly from the delivery end of said press, a carriage supported on said rails and movable outwardly thereon from said press and inwardly below the delivery end of the press to receive blanks therefrom, a platform on said carriage having apertures formed therein to pass slugs punched from said slug areas, a drive lever oscillated with each cycle of said press and connected by a rod to said carriage to reciprocate the carriage, other rails extending parallel to the outer portions of said first rails and inclined upwardly at their inner ends, a frame slidable on said other rails and drivingly connected to said carriage for reciprocation therewith, a transparent punch panel carried by said frame over said carriage, slug punching pins on said panel and projecting therebelow, said panel having rollers at its inner and outer ends engaged with said other rails, said other rails having downwardly then upwardly inclined depressions in their upper surfaces to lower said rollers and said panel toward said carriage and said platform, bridge bars mounted alongside of said other rails and movable with respect thereto into bridging relation with said depressions to support said rollers across said depressions, and means actuated in timed relation to said frame and connected to advance and retract said bridge bars to retracted nonbridging relation to the recesses in said other rails on part of the forward motion of said carriage, and to extended bridging position on the retracting stroke of the frame.

14. In a slug punching machine having a blank supporting platform and a punch frame reciprocable in registered lapped relation, a first set of rails supporting said platform, a second set of rails supporting said frame, carriers at the front and rear of said punch frame coacting with said second rails, said second rails having front and rear double inclined depressions located toward the front ends thereof arranged to simultaneously receive said carriers and lower said punch frame into coacting punching relation to said platform, bridge bars extending alongside said second rails and movable transversely into and out of bridging relation to said depressions, shift means connected to said bridge bars, cams driven in timed relation with said platform and frame, and cam followers connected to said shift means and engageable with said cams whereby the cams actuate said bridge bars to permit said carriers to simultaneously enter said depressions on the advancing stroke of said platform and said frame and to support said carriers on said bridge bars on the retracting stroke of said platform and frame.

15. A slug punching machine in combination with a press adapted to deliver single blanks with slug areas cut therein, said machine comprising a carriage movable outwardly from said press and inwardly below the delivery end of the press to receive blanks therefrom, a platform on said carriage having apertures formed therein to pass slugs punched from said slug areas, means oscillated with each cycle of said press and connected to said carriage to reciprocate the carriage, a frame slidable on said machine and drivingly connected to said carriage for reciprocation therewith, a transparent punch panel carried by said frame over said carriage, slug punching pins on said panel and projecting therebelow, said frame being supported in spaced lapped relation to said carriage, means actuated in timed relation to said frame and connected to transversely advance and retract said frame relative to said carriage to advance said pins through said platform on the advancing stroke of the carriage and to retract the pins prior to and during the retraction stroke of the carriage, a plate pivotally supported on said carriage below said apertures, and means on said carriage to tilt said plate from a horizontal position closely spaced below the lowermost position of said pins to an inclined discharge position and return, said tilting means being operative in response to reciprocation of said carriage.

16. A slug punching machine in combination with a press adapted to deliver single blanks with slug areas cut therein, said machine comprising a carriage movable outwardly from said press and inwardly below the delivery end of the press to receive blanks therefrom, a platform on said carriage having apertures formed therein to pass slugs punched from said slug areas, means oscillated with each cycle of said press and connected to said carriage to reciprocate the carriage, a frame slidable on said machine and drivingly connected to said carriage for reciprocation therewith, a punch panel carried by said frame over said carriage, slug punching pins on said panel and projecting therebelow, said frame being supported in spaced lapped relation to said carriage, means actuated in timed relation to said frame and connected to transversely advance and retract said frame relative to said carriage to advance said pins through said platform on the advancing stroke of the carriage and to retract the pins prior to and during the retracting stroke of the carriage, a plate pivotally supported on said carriage below said apertures, and means to tilt said plate from a horizontal position closely spaced below the lowermost position of said pins to an inclined discharge position and return.

17. A slug punching machine adapted to punch slug areas partially cut from blanks comprising side rails, a carriage supported on said rails and movable outwardly and inwardly thereon, a platform on said carriage having apertures formed therein to pass slugs punched from said slug areas, means connected to said carriage to reciprocate the carriage, other rails extending parallel to said first rails, a frame slidable on said other rails and drivingly connected to said carriage for reciprocation therewith, a punch panel carried by said frame over said carriage, slug punching pins on said panel and projecting therebelow, said frame having rollers at its inner and outer ends engaged with said other rails, said other rails having downwardly then upwardly curved depressions in their upper surfaces to lower said rollers and said panel toward said carriage and said platform, bridge bars mounted alongside of said other rails and movable with respect thereto into bridging relation with said depressions to support said rollers across said depressions, shift means connected to said bridge bars to move said bridge bars to retracted non-bridging relation to the recesses in said other rails on part of the forward motion of said carriage, a plate pivotally supported below the apertures in said carriage and reciprocable with the carriage, and means for tilting said plate from a horizontal position closely spaced below the lowermost position of said pins to an inclined discharge position after said pins are lowered, said tilting means including coacting tappets on said carriage and a fixed part along the path of travel of said carriage.

18. A slug punching machine adapted to punch slug areas partially cut from blanks comprising side rails, a carriage supported on said rails and movable outwardly and inwardly thereon, a platform on said carriage having apertures formed therein to pass slugs punched from said slug areas, means connected to said carriage to reciprocate the carriage, other rails extending parallel to said first rails, a frame slidable on said other rails and drivingly connected to said carriage for reciprocation therewith, a punch panel carried by said frame over said carriage, slug punching pins on said panel and projecting therebelow, said frame having supports at its inner and outer ends engaged with said other rails, said other rails having downwardly then upwardly curved depressions in their upper surfaces to lower said supports and said panel toward said carriage and said platform, bridge bars mounted alongside of said other rails and movable with respect thereto into bridging relation with said depressions to support said supports across said depressions, shift means connected to said bridge bars to move said bridge bars to retracted non-bridging relation to the recesses in said other rails on part of the forward motion of said carriage, a plate pivotally supported below the apertures in said carriage and reciprocable with the carriage, and means for tilting said plate from a horizontal position closely spaced below the lowermost position of said pins to an inclined discharged position after said pins are lowered.

19. A slug punching machine adapted to punch slug areas partially cut from blanks comprising side rails, a carriage supported on said rails, a platform on said carriage having apertures formed therein to pass slugs punched from said slug areas, means connected to said carriage to reciprocate the carriage, a frame drivingly connected to said carriage for reciprocation therewith, a punch panel carried by said frame over said carriage, slug punching pins on said panel and projecting therebelow, support means for said frame adapted to lower said panel toward said carriage to extend said pins through said platform at one point in the cycle of said carriage, a plate pivotally mounted on said carriage below said apertures, and mean for tilting said plate between a horizontal position closely spaced below the lowermost position of said pins and an inclined discharge position after said pins have been lowered.

20. In a slug punching machine, a platform adapted to support carton blanks having slug areas cut therein, said platform having apertures registering with said slug areas, a punch having male die pin members positioned over said platform with said die pin members registering with said apertures, means for reciprocating said punch to advance said die pin members through said apertures, a backing plate positioned below said platform in closely spaced relation to the lowered position of said die pin members, and means for tiltably moving said backing plate away from said apertures after said die pin members have punched slugs through the apertures.

21. In a slug punching machine, a platform adapted to support carton blanks having slug areas cut therein, said platform having apertures registering with said slug areas, a punch having male die members positioned over said platform with said die members registering with said apertures, means for reciprocating said punch to advance said die members through said apertures, a backing plate positioned below said platform in closely spaced relation to the lowered position of said die members, and means for moving said backing plate away from said apertures after said die members have punched slugs through the apertures.

22. In a slug punching machine, a support member adapted to support a blank with a slug area cut therein, said support member having an aperture therein registering with said slug area, a male punch member movable into said aperture to punch a slug therethrough, a backing member positioned behind said support member and registering with said aperture closely adjacent the advanced position of said male punch member, and means for moving said backing member away from said support member after said punch member has punched a slug through said aperture.

References Cited in the file of this patent
UNITED STATES PATENTS 2,233,065    Walter _____ Feb. 25, 1941